United States Patent [19]

McCloskey

[11] 4,251,122
[45] Feb. 17, 1981

[54] SELF ADJUSTING BEARING ASSEMBLY

[75] Inventor: Albert R. McCloskey, Fairfield, Conn.

[73] Assignee: Incom International Inc., Pittsburgh, Pa.

[21] Appl. No.: 584,303

[22] Filed: Jun. 6, 1975

Related U.S. Application Data

[63] Continuation of Ser. No. 451,523, Mar. 15, 1974, abandoned.

[51] Int. Cl.³ .................. F16C 9/06; F16C 23/04; F16C 25/04; F16C 43/02
[52] U.S. Cl. .................. 308/72; 29/148.4 R; 308/238
[58] Field of Search ......... 29/148.4, 148.5, 149.5 B, 29/148.4 R; 308/72, 237 R, 238; 403/12, 34, 35, 36, 37, 38, 39, 128, 130, 133, 134, 135, 268

[56] References Cited

U.S. PATENT DOCUMENTS

| | | | |
|---|---|---|---|
| 1,304,270 | 5/1919 | Dawson et al. | 403/128 |
| 2,478,056 | 8/1949 | Reeg | 308/72 |
| 2,675,283 | 4/1954 | Thomson | 308/238 |
| 3,089,221 | 5/1963 | Barr | 29/148.4 |
| 3,482,890 | 12/1969 | Burrell | 308/72 X |
| 3,655,249 | 4/1972 | Abel | 308/72 |

FOREIGN PATENT DOCUMENTS 407098 12/1924 Fed. Rep. of Germany ........... 403/128

Primary Examiner—Howard Beltran
Attorney, Agent, or Firm—James Creighton Wray

[57] ABSTRACT

A spherical bearing assembly having an inner race member and an outer race member, the inner surface of the outer race member being a concave spherical surface, the outer surface of the inner member being a complementary convex spherical surface, the inner member including a spool member having a first threaded portion disposed on its outer surface and at least two spherical segments, each segment having a second threaded portion on its inner surface complementary to said first threaded portion on the outer surface of said spool member, said segments disposed on and interlocked with said spool member by the meshing of said complementary first and second threaded portions.

1 Claim, 8 Drawing Figures

SELF ADJUSTING BEARING ASSEMBLY

This is a continuation of application Ser. No. 451,523, filed Mar. 15, 1974 for SPHERICAL BEARING ASSEMBLY by Albert R. McCloskey, now abandoned, the priority of which is claimed.

BACKGROUND OF THE INVENTION

The present invention relates generally to self-aligning bearings having a ball-like inner member with a convex outer surface and an outer member having an inner surface with complementary concave spherical inner face. These types of bearings, which are commonly called "spherical bearings", have been utilized in industry for a substantial period of time. The technological evolution of these type bearings has been directed more in the terms of material composition of its various component parts rather than toward basic changes in design concepts. Accordingly, the design advances in spherical bearings have not been substantial in nature and thereby presently limiting their applications.

One area in which the spherical bearings have been extensively applied is the aircraft industry. This is due to the spherical bearing self-aligning characteristic. A typical such application is marrying of a spherical bearing to machine tool or to a landing gear strut or member of an airplane. In these types of applications the outer race is common press-fitted and/or staked into a housing or the like, rendering the bearing difficult to remove and/or maintain. When any such maintenance is required, such as replacing of the ball, the entire bearing assembly including the inner and outer race member would have to be removed and replaced by an entirely new bearing assembly. Such an operation could entail substantial expense and down time of the entire machine tool or aircraft.

There are a number of prior art type spherical bearings which have been addressed to this kind of problem. One such type prior art bearing is the "messerschmidt" bearing. A concept of this bearing is that the ball can be removed in the field without disassembling the entire bearing, that is, removing the outer race member from its mounting. The messerschmidt type spherical bearing has proved somewhat unsatisfactory in that its overall bearing surface is decreased by the provision of a slot. This decrease or rather limited bearing surface area has a marked negative effect on the bearing performance characteristics.

SUMMARY OF THE INVENTION

It is therefore, a primary object of the present invention to provide a spherical bearing assembly having an inner race member and an outer race member, the inner surface of the outer race member being a concave spherical surface, the outer surface of the inner member being a complementary convex spherical surface, the inner member including a spool member having a first threaded portion disposed on its outer surface and at least two spherical segments, each segment having a threaded portion on its inner surface complementary to said first threaded portion on the outer surface of said spool member, said segments disposed on and interlocked with said spool member by the meshing of said complementary first and second threaded portions.

It is yet another object of the present invention to provide a spherical bearing assembly which is provided with a threaded spool member having integrally formed on one end thereof a hub portion, the hub portion adapted to abut the lateral face of the spherical segments of the inner race member.

It is still another object of the present invention to provide a spherical bearing assembly in which said spool member's axial length is somewhat greater than the axial length of said spherical segments such that when the spool member is threaded in meshing relationship with the spherical segments and said integrally formed hub abuts against the lateral face of said spherical segments, a portion of said threaded spool extends beyond the lateral face of said spherical segments opposite to the end on which the said hub is formed, said extended portion adapted to receive a threaded nut-like member to further positively lock the spool member in meshing relationship with said spherical segments.

It is yet another object of the invention to provide a spherical bearing assembly which is adapted to be assembled by the method including the steps of preforming the outer race member, placing at least two spherical segments within said outer race member such that said spherical segments form an inner race member having a central threaded bore, threading a spool member into meshing relationship with said spherical segments thereby interlocking as an integral unit said inner race member within said outer race member.

It is still another object of the present invention to provide a spherical bearing assembly in which the threaded portion formed on the inner surface of the spherical segments are annular and in line and form a continuous annular groove which is adapted to receive the threaded portion disposed on the outer surface of the spool member.

It is still another object of the present invention to provide a spherical bearing assembly in which there are three spherical segments, the segments providing substantially all of a first bearing surface between the inner member and the outer member.

It is still another objecct of the present invention to provide a spherical bearing assembly in which the concave inner surface is coated with a self-lubricating plastic such as "Teflon", a trademark of the DuPont Corporation.

It is yet another object of the present invention to provide a spherical bearing assembly in which the outer surface of said inner member as defined by the spherical segments are coated with self-lubricating plastic such as Teflon.

It is still another object of the present invention to provide a spherical bearing assembly in which the threaded portion is disposed on the outer surface of the spool member and the threaded portion is formed by in-line annular grooves formed on the inner surface of the spherical segments.

Embodiments of the bearing according to the concept of the present invention are shown and/or described by way of example in the accompanying drawings and following description of the invention without attempting to show or describe all of the various forms and modifications in which the invention might be embodied; the invention being measured by the appended claims and not by the details of the specification.

DESCRIPTION OF THE INVENTION

Figure 1:
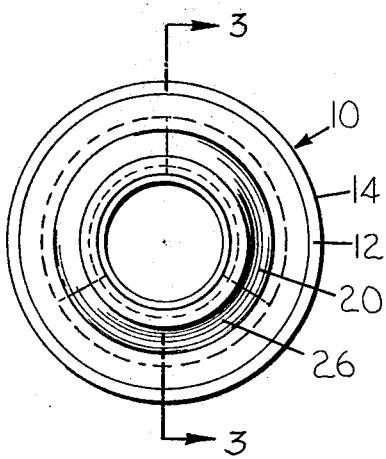
FIG. 1 is a side elevational view of the spherical bearing assembly embodying the present invention with the longitudinal axis of the outer race member and the inner race member being substantially coincident.
Figures 2, 3:
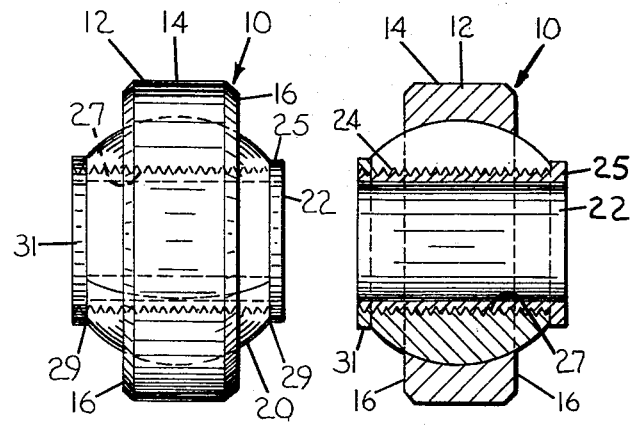
FIG. 2 is a front partial phantom elevational view of the spherical bearing assembly of FIG. 1.
FIG. 3 is a front sectional view taken along line 3—3 of FIG. 1.

A spherical bearing embodying the concept of the present invention is generally indicated, as appropriate, by numeral 10 on the attached drawing as set forth in FIGS. 1 through 6, inclusive.

The bearing 10 has been shown as a spherical bearing, however, the present invention is also directly applicable to male or female rod end type bearings and the like.

The spherical bearing 10 comprises an outer member 12 which may be provided with an outer cylindrical surface 14. The outer member 10 may also be provided with two annular faces 16. The outer member 12 is further provided with a concave spherical inner surface 18. It may be noted at this juncture that the outer member 12 may be similar to the outer race members as found in the prior art.

The basic thrust of the present invention is to be found in the inner race member, which is typically formed in the prior art as a single solid member. The inner race member 20 as distinguished from the inner members of the prior art is a composite member having several parts. The basic part or member is a threaded spool member 22. The spool member 22 may be characterized as a spool member having a threaded outer surface 24. The threads on the spool member 22 may be formed in helical fashion and may be selected from a number of different types of threads as found in a typical mechanical engineering handbook, as for example, MARK'S STANDARD HANDBOOK FOR MECHANICAL ENGINEERS, Seventh Edition, Section 8, MACHINE ELEMENTS. The spool member 22 may be formed with or without an integral hub portion 25 whose purpose and function will be explained in further detail below.

The inner member 20 is also provided with at least two spherical segments 26. As can be seen from the various Figures the spherical segments 26 which are three in number when placed within the outer race member 12 in an abutting relationship from the bearing portion of the inner member 20. The three spherical segments 26 are provided with a threaded inner surface 27. The threaded inner surface 27 of the spherical segments 26 provide a complementary threaded bore complementary to the threaded outer surface of the spool member 22. The threaded bore formed by the inner surface of the spherical segments 26 may be analogized to the nut of a nut and bolt arrangement, the bolt being the spool and in particular the threaded outer surface of said spool member 22. Accordingly, it can be seen that the spherical segments 26 can be placed in abutting relationship within the outer member 12 and the spool member 22 may be threaded in a meshing relationship within the central bore as defined by the assembled spherical bearing segments 26. When the spool member 22 is fully threaded into meshing relationship with the spherical segments, it can be further seen that the spherical segments 26 are thereby maintained in a fixed operational relationship with respect to the spool member 22. This mechanical interlocking relationship of the threaded inner surface of the spherical segments 26 and the threaded outer surface of the spool member 22 acts to maintain the overall operational integrity of the spherical bearing 10.

As before mentioned, the spool member 22 may be provided with an integrally formed hub portion 25. The spool member 22 when in its threaded relationship with the spherical segments 26 can be further positively locked in relation to said spherical segments by the abutting of the so-formed hub portion 25 against the lateral faces 29 of the spherical segments. This locking arrangement can be further reinforced and enhanced by providing an extension of the spool member such that a portion thereof extends beyond the lateral face 29 of the spherical segments opposite to the sides 29 abutted by the integrally formed hub 25. This can best be seen in FIGS. 5A, 5B and 5C. The threaded portion of the spool member 22 that extends beyond the lateral face 29 of the spherical segments may be adapted to receive an annular nut-like member 31. The annular ring may be characterized as a "lock nut" and may be provided with a threaded inner surface 33 complementary to the threaded outer surface of the spool member 22. The threading of the ring 31 upon a spool member 22 such that the lateral face of the ring 31 will abut with the lateral face 29 of the spherical segments. The abutting of the ring 31 against the lateral faces 29 of the spherical segments 26 will, as before mentioned, further positively lock the spherical segments within the outer member 14 and on the spool member 22. The outer surface of the ring 31 as well as the outer peripheral portion of the hub 25 may be provided with a nut-like structure or knurled structure (neither shown) for the ready application of a tool such as a wrench which will aid and assist the threading of the various parts into mechanical interlocking relationship.

Figure 6:
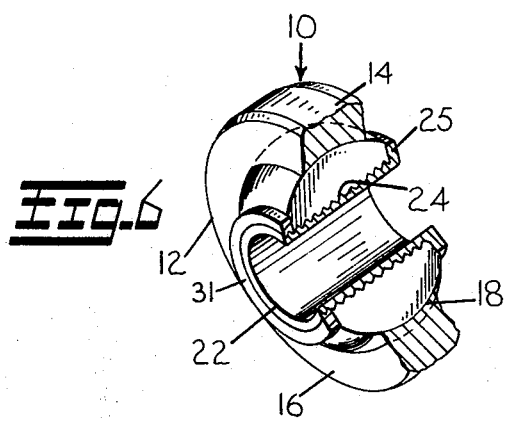
FIG. 6 is a perspective sectional view of the spherical bearing of FIG. 1.
Figure 4:
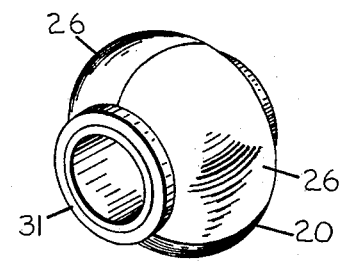
FIG. 4 is a perspective view of the inner race member alone in an assembled condition.
Figure 5:
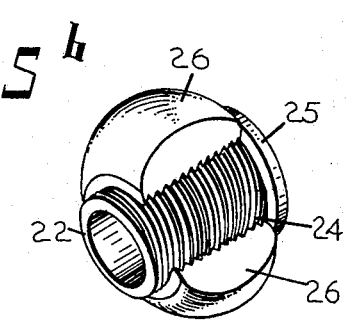
FIGS. 5a, 5b, 5c illustrate a perspective view of the component parts of the inner race member of FIG. 4.
Figure 5:
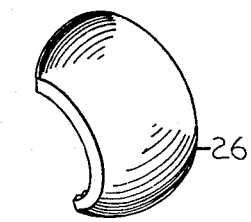
Figure 5:
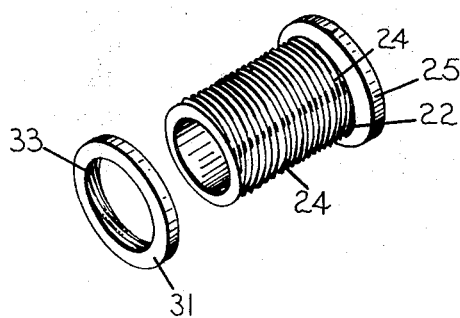

It should be noted that the spool member 22 of FIG. 6 is shown only with the hub portion 25, while FIGS. 1 to 5 show the threaded application of the ring 31 to the spool member 22. Further the spool member could be formed without the hub portion 25 (not shown). It can be seen, therefore, that the inner member 20 can be completely dismantled and removed from the outer member 12 without dislodging or otherwise interferring with the position or the condition of the outer member with respect to its mounting surface (not shown). This feature becomes particularly important when the outer face member is fixedly attached to some structural surface such as by press-fit or the like. For example, in an aircraft or machine tool type application, a new inner member 20 may be inserted quickly and efficiently without disturbing any other part of the aircraft or machine tool except that part which is directly attached to the inner member 20 thereby avoiding costly down time expenses.

An additional very important feature of the present invention is that the inner member 20 can be sized by varying the dimension of the convex outer surface as defined by the segments 26. By varying this dimension certain bearing wear, which may be experienced by the inner concave surface of the outer member 12, can be accommodated, thereby maintaining the overall bearing tolerance of the bearing assembly 10.

It is to be noted that threaded portion 24 depicted in the drawings as being disposed throughout the entire outer surface of the spool member 22, while the complementary threaded portion 27 is disposed throughout the entire inner surface of the spherical segments. The respective threaded areas could, of course, cover only a partial portion of the inner surface of the spherical segments 26 and the outer surface of the spool member 22. The axial position of the various threaded portions could also be changed from the central position.

It should be noted that the outer spherical of the spherical segments 26 and/or the inner concave surface of the outer race member 12 could be coated with a self-lubricating plastic such as Teflon.

As before mentioned, the present invention provides a marked improvement in the ability to service spherical bearings in the field without displacing or otherwise dislodging the outer race member. This is accomplished without any compromise in the bearing performance or characteristic such as a reduction in the overall bearing surface which is typified by the prior art bearings such as the messerschmidt type ball spherical bearing.

From the above description of the invention along with various figures as set forth in the drawings it will be readily seen and appreciated that a spherical bearing embodying the concept of the present invention will positively and effectively accomplish the objectives of the invention. The above-noted embodiment is shown by way of example without attempting to show all the various forms and modifications in which the invention might be embodied; the invention being measured by the appended claims and not the specific details of the specification.

As before mentioned, the present invention provides a marked improvement in the ability to service spherical bearings in the field without displacing or otherwise dislodging the outer race member. This is accomplished without any compromise in the bearing performance or characteristic such as a reduction in the overall bearing surface which is typified by the prior art bearings such as the messerschmidt type ball spherical bearing.

From the above description of the invention along with various figures as set forth in the drawings it will be readily seen and appreciated that a spherical bearing embodying the concept of the present invention will positively and effectively accomplish the objectives of the invention. The above-noted embodiment is shown by way of example without attempting to show all the various forms and modifications in which the invention might be embodied; the invention being measured by the appended claims and not the specific details of the specification.

I claim:

1. A spherical bearing assembly having an inner race member and an outer race member, the inner surface of the outer race member being a concave spherical surface, the outer surface of the inner member being a complementary convex spherical surface, the inner member including a hollow spool member having a smooth inner cylindrical surface and having first threaded portion disposed on its outer surface and at least three spherical segments, each segment having a partially spheroidal outer surface and partially cylindrical inner surface, said surfaces being connected by planar surfaces on radial planes passing through an imaginary center line of a cylinder on which said partially cylindrical inner surface is formed and each segment having parallel sloped grooves on the inner surface terminating in the radial planes whereby when the segments are assembled by placing them within the outer race member such that their outer spherical surfaces are in bearing contact with said inner concave surface and each of said spherical segments are in an abutting relation, the inner surfaces of said spherical segments defining a central bore, the grooves in their inner surfaces form a continuous annular groove which forms a second helically threaded portion on the inner surfaces complementary to said first threaded portion, said segments disposed on and interlocked with said spool member and interlocked together solely by the registration of said first threaded portion in said complementary second threaded portion, whereby during assembly the spool is turnable within the segments with the first threaded portion moving along the second threaded portion, the spool member and the spheroidal segments together forming the inner race member, and the inner surface of the inner race member is the smooth inner cylindrical surface, whereby machine elements may be mounted in the smooth inner cylindrical surface of the inner race member and in which said spool member's axial length is somewhat greater than the axial length said bore such that said spool member, when threaded in a meshing relationship with said spherical segments, a portion of said threaded spool will extend beyond one of the lateral faces defined by the spherical segments, said extension of said spool member being adapted to receive a threaded nut-like member to further lock said spool member and said spherical segments in their respective operational positions, and wherein said spool member has a hub portion formed integrally on one end thereof, said hub portion having an inner lateral surface, said spherical segments defining an opposing lateral surface, said hub portion inner lateral surface adapted to abut said lateral surface of said spherical segments thereby further locking said spherical segments in their operational position.

* * * * *